UNITED STATES PATENT OFFICE.

JAMES H. McCARTY AND HENRY B. McCARTY, OF STROUDSBURG, PA.

IMPROVEMENT IN FLUIDS FOR EMBALMING.

Specification forming part of Letters Patent No. 222,521, dated December 9, 1879; application filed January 25, 1879.

*To all whom it may concern:*

Be it known that we, JAMES H. McCARTY and HENRY B. McCARTY, of Stroudsburg, in the county of Monroe and State of Pennsylvania, have invented a new and useful process for preserving the bodies of the dead for any desired length of time, which process is fully set forth in the following specification.

Our invention relates to an improvement in embalming compounds; and it consists of a compound composed of sulphate of zinc, water, salicylic acid dissolved in alcohol, and white-oak bark, which compound is to be injected into the body through the natural openings to prevent decomposition.

Very frequently after death, and especially in hot weather, the body becomes so discolored, and bad odors arise from it so rapidly, that all desire to have the body embalmed is destroyed, and many bodies which would otherwise be embalmed for transportation to friends have to be buried as quickly as possible and in the most convenient place.

Where the body has become discolored and bad odors are arising from it, before we proceed to embalm the body we apply a fluid to the skin composed of sulphate of atropia, six ounces; boiling alcohol, one gallon; alum, four ounces; salpeter, four ounces.

The sulphate of atropia is first mixed with the hot alcohol, and then the other parts are added after the alcohol has become cool. This mixture is applied to the discolored parts either as a wash or by means of cotton.

After the discoloration is removed and the odors stopped a compound composed of the following-named ingredients is injected into the body through the natural openings: sulphate of zinc, four ounces; water, one gallon. After filtering add salicylic acid, (dissolved in alcohol,) four ounces; extract white-oak bark, one-half gallon.

This mixture at once arrests decomposition and preserves the body from further decay.

Having thus described our invention, we claim—

A compound for embalming, composed of sulphate of zinc, water, salicylic acid dissolved in alcohol, and extract of white-oak bark, in or about the proportions specified.

JAMES H. McCARTY.
HENRY B. McCARTY.

Witnesses:
LUTHER G. VAN VLIET,
DARIUS DUHER.